United States Patent [19]

Desrochers

[11] Patent Number: 5,529,157
[45] Date of Patent: Jun. 25, 1996

[54] COMBINATION BRAKE AND CLUTCH ASSEMBLY FOR ELECTRIC MOTORS

[75] Inventor: Eddy Desrochers, St-Hubert, Canada

[73] Assignee: Manaras Auto Doors Inc., St-Laurent, Canada

[21] Appl. No.: 271,907

[22] Filed: Jul. 8, 1994

[30] Foreign Application Priority Data

Dec. 30, 1993 [CA] Canada ................ 2112609

[51] Int. Cl.$^6$ ............................................ F16D 67/02
[52] U.S. Cl. .................. 192/16; 192/8 R; 477/9; 477/22
[58] Field of Search .............. 192/7, 8 R, 15, 192/16; 477/9, 21, 22

[56] References Cited

U.S. PATENT DOCUMENTS

| | | | |
|---|---|---|---|
| 2,408,808 | 10/1946 | Paulus et al. | 477/9 X |
| 3,108,669 | 10/1963 | Ateliani | 192/8 R |
| 3,667,578 | 6/1972 | Johnson | 192/8 R |
| 3,692,161 | 9/1972 | Katsuren et al. | 192/8 R |

FOREIGN PATENT DOCUMENTS 1165785  4/1984  Canada .

Primary Examiner—Richard M. Lorence
Attorney, Agent, or Firm—Swabey Ogilvy Renault

[57] ABSTRACT

A brake and clutch assembly mounted on an electric motor's drive shaft comprises, in succession and outwardly from the motor, a brake pad, a drive disk, a clutch plate, a pulley, a compression spring and an end cap. The drive disk includes a sleeve with the clutch plate and the pulley being slidably mounted thereon. A pin extending diametrically through the shaft lies in a diametrical V-shaped recess defined in the drive disk. The spring biases the pulley, clutch plate and disk drive towards the brake pad thereby frictionally retaining the drive disk thereagainst when the motor is not operating and preventing the components from rotating. When the motor is started, the pin climbs out of the bottom of the recess by pushing the drive disk against the spring's force thereby axially displacing slightly the disk drive away from the brake pad such that the pin rotates the drive disk which frictionally drives the clutch plate and the pulley. Resistance applied against the rotation of the pulley causes the clutch plate to slip thereby allowing the pulley to stop while the clutch plate, the drive disk and the motor shaft continue to rotate, thus preventing damage to the motor. The friction forces between the clutch plate and the pulley are insufficient to stop the clutch plate and thus the drive disk and the motor shaft if the pulley is forced to stop rotating.

6 Claims, 4 Drawing Sheets

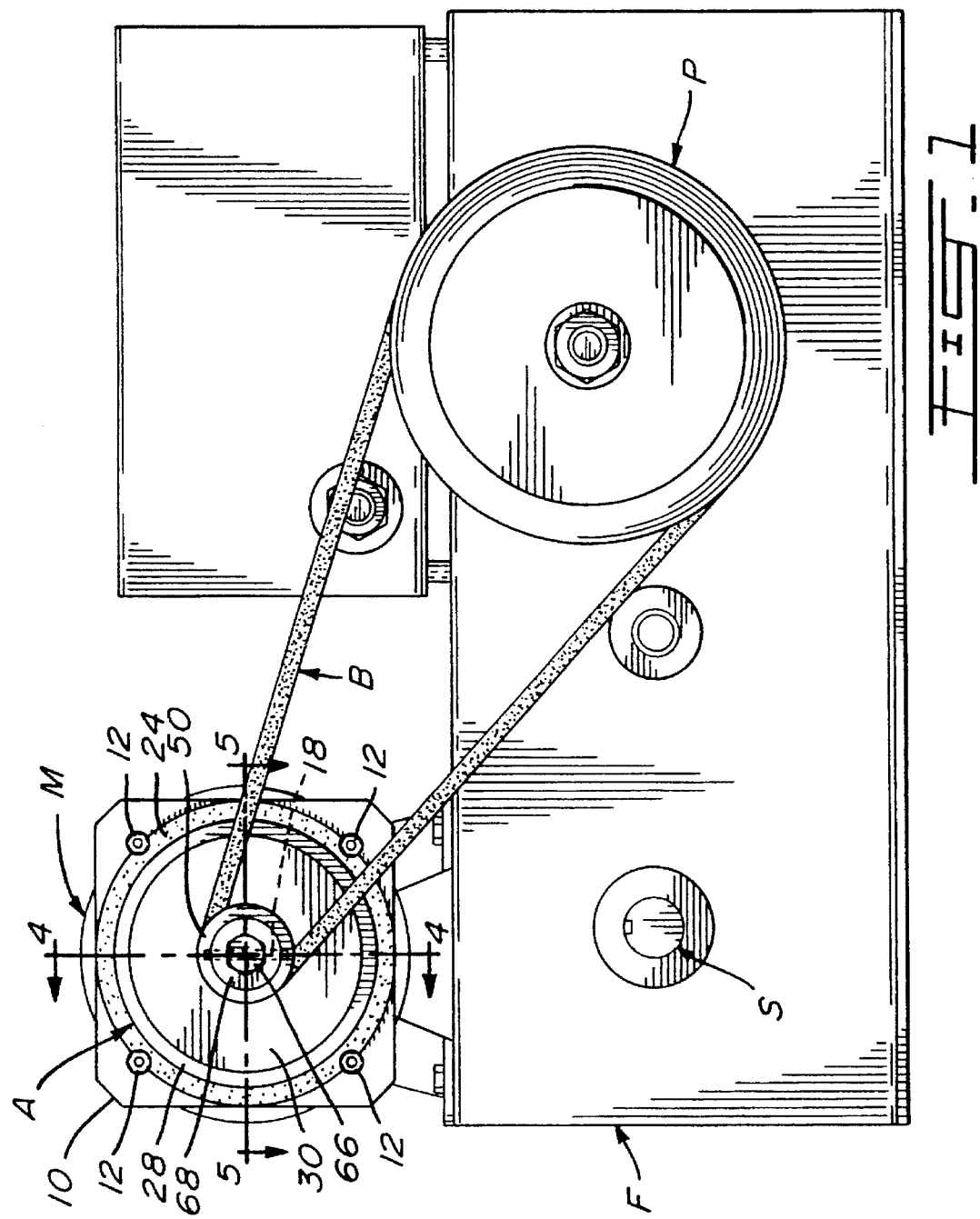

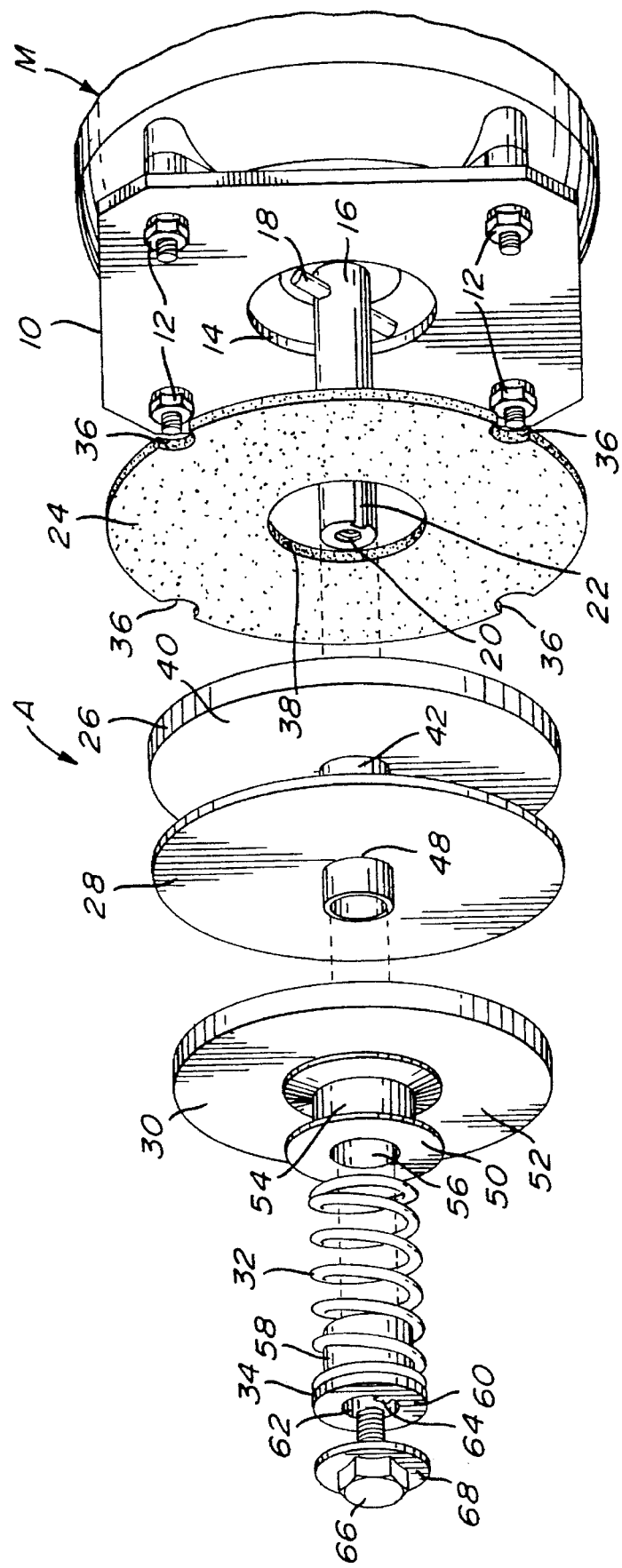

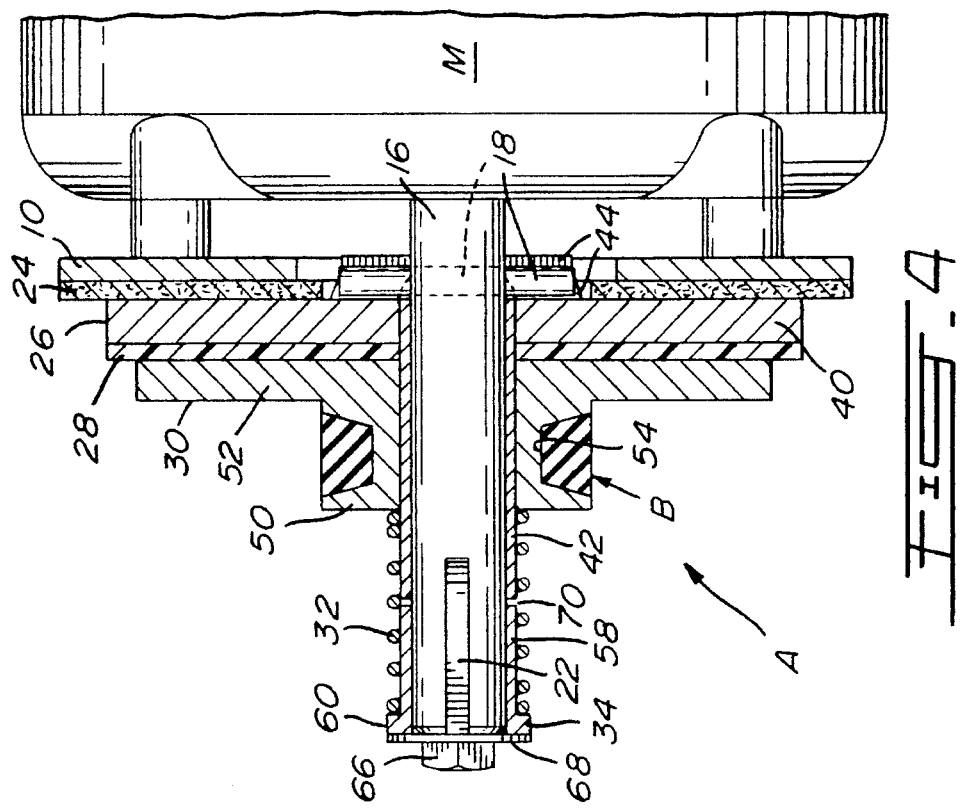
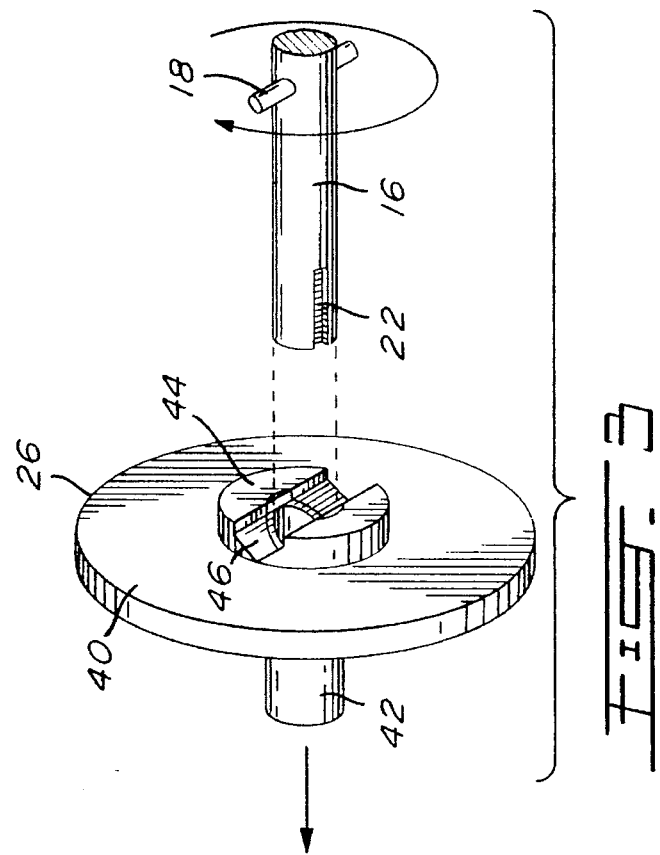

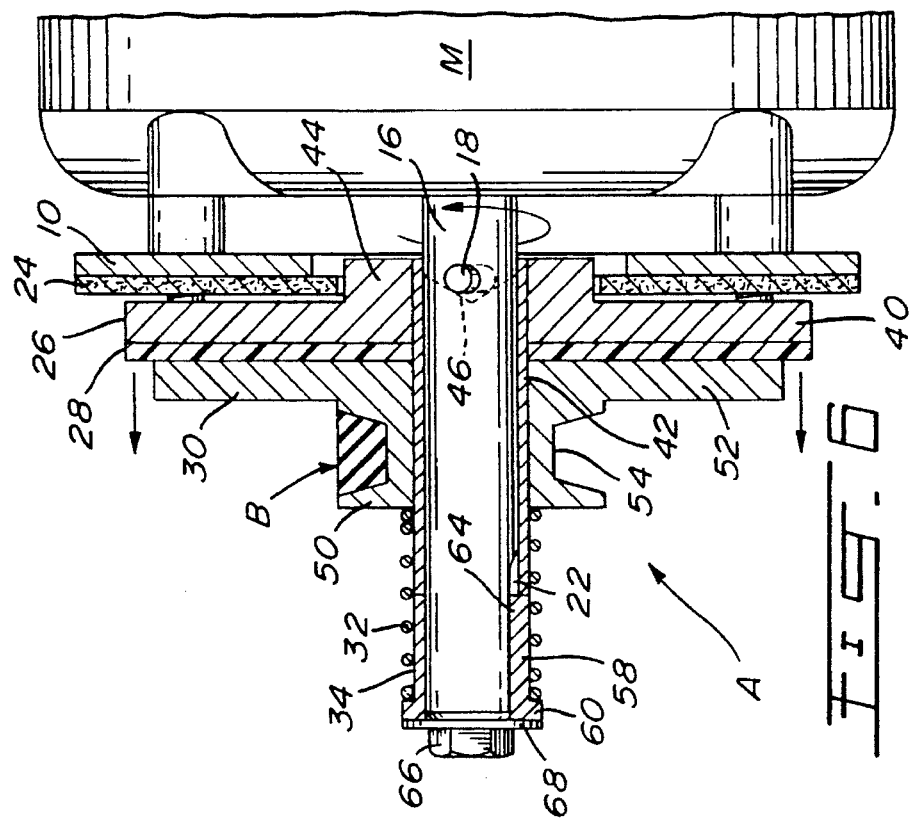
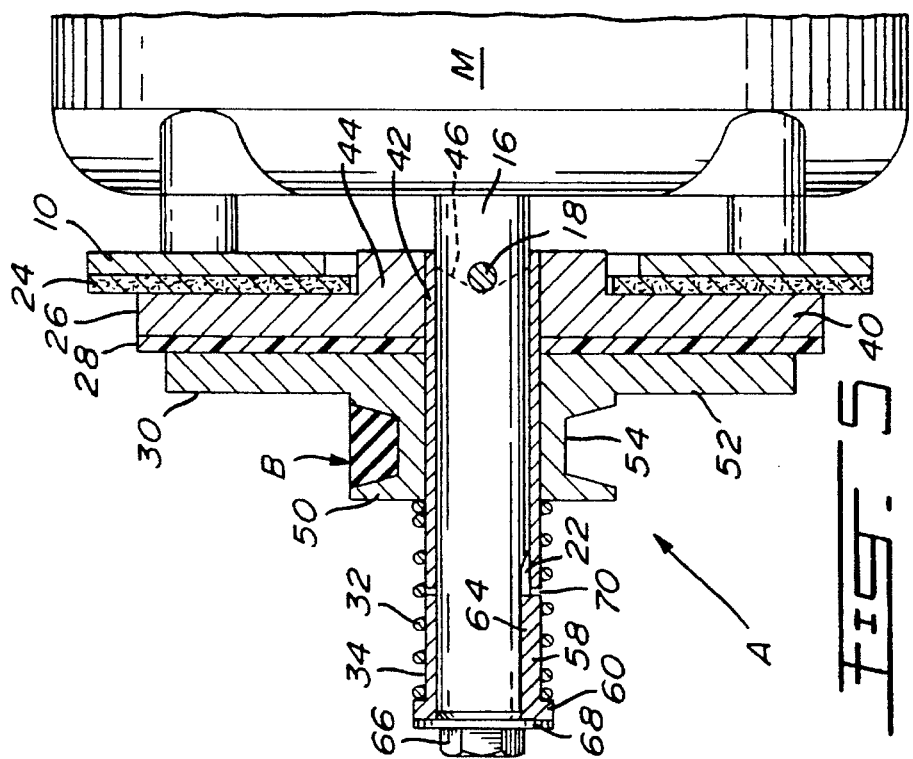

COMBINATION BRAKE AND CLUTCH ASSEMBLY FOR ELECTRIC MOTORS

BACKGROUND OF THE INVENTION

1. Field of the Invention

The present invention relates to a drive assembly for an electric motor and, more particularly, to a combination brake and clutch assembly for electric motors.

2. Description of the Prior Art

It is well known in the art of various devices, such as closures, which are operated by way of electric motors to provide the electric motor with a brake to prevent manual operation of the closure by unauthorized personnel or the like.

For instance, Canadian Patent No. 1,165,785 issued on Apr. 17, 1984 discloses a typical brake for electric motors used frequently in the art.

More particularly, with reference to FIGS. 1 and 2 of the aforementioned Canadian Patent, a door operator 10 comprises an electric motor 11 adapted to drive a V-belt pulley 12 mounted on the motor shaft which in turn drives, by way of a V-belt 15, a larger V-belt pulley 13 provided on an intermediate shaft 14. A chain drive 16 connects the intermediate shaft 14 to an intermediate sprocket 17 mounted on shaft 18 while a further chain drive 19 joins the shaft 18 to a drive sprocket 20 which operates an output shaft 21. The output shaft 21 which is supported on two pillow blocks 22 mounted on frame members 23 is adapted to open and close a closure, such as a garage door or the like. A control box 25 is mounted on the frame members 23.

More importantly with respect to the present invention, the motor shaft is provided with a brake 27 which is operated by a lever mechanism 28. The lever mechanism 28 is connected to an arm 29 rotated by a shaft 30 entering the control box 25. A solenoid 42 operates in such a way so as to rotate the brake shaft 30, whereby when the electric motor 11 is powered to go in either direction the solenoid 42 is energized thereby causing the brake 27 to be released.

Therefore, when the motor 11 is not operating, the solenoid 42 ensures that the two-jawed clamp-type brake 27 grips firmly the motor shaft to prevent the same from rotating, whereby the equipment, such as a closure, connected to the motor shaft and thus normally operated by the electric motor 11 cannot be manually displaced. Obviously, in the aforementioned Canadian Patent, this tamper-proof feature can be by-passed as there is provided a manual release lever 31 on the other side of the door operator 10 from the brake 27 which comprises a linkage (not shown) for allowing the brake 27 to be manually released when it is necessary to operate the door operator 10 manually. Applicant wishes herein only to illustrate a typical brake mechanism which is used on a motor shaft for preventing the manual rotation of the motor when the latter is not energized and thus also the operation of the closure, or the like, connected thereto.

Accordingly, the typical braking system for electric motors requires a solenoid which, after some use, tends to fail. Furthermore, it would also be preferable to incorporate a clutch mechanism to protect the motor in the event that the equipment operated by the motor (such as a closure) does not work properly and produces a torque against the rotation of the motor shaft which could cause the speed of the latter to be reduced or even stopped.

SUMMARY OF THE INVENTION

It is therefore an aim of the present invention to provide a novel braking device for electric motors which is completely mechanical, i.e. which is exempt of components such as solenoids.

It is also an aim of the present invention to provide a combination brake and clutch mechanism for electric motors for preventing a manual rotation of the motor when it is not electrically operated and for protecting the motor if outside resistance forces are applied against the rotation of the motor.

It is a further aim of the present invention to provide a novel combination brake and clutch mechanism for electric motors which is more reliable than solenoid-based systems as well as being cheaper to manufacture and to repair.

Therefore, in accordance with the present invention, there is provided a braking device for electric motors comprising brake means adapted to be mounted around a shaft means adapted to be driven by an electric motor, a drive means for transmitting the rotation of the motor to remote equipment, a biasing means for urging the drive means in braking engagement with the brake means when the motor is not operating, and brake release means adapted upon rotation of the motor and thus of the shaft means to displace the drive means against the force of the biasing means and out of the aforementioned braking engagement with the braking means, the shaft means being adapted to rotatably drive the drive means when the motor is in operation.

Also in accordance with the present invention, the drive means comprises first and second drive means and a clutch means disposed therebetween, the first drive means being adapted to be driven by the shaft means when the motor is in operation and to frictionally drive the clutch means and the second drive means, the second drive means being adapted to drive the remote equipment, the clutch means being adapted to disengage the frictional engagement between the first and second drive means when sufficient forces are applied against the rotation o the second drive means.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a side elevational view of a novel combination brake and clutch assembly in accordance with the present invention which is shown adapted to a motor shaft driven by an electric motor with the novel assembly being adapted for rotatably driving some equipment by way of a belt;

FIG. 2 is a perspective exploded view of the combination brake and clutch assembly of the present invention illustrated in FIG. 1;

FIG. 3 is a perspective view of a detail of the combination brake and clutch assembly illustrated in FIG. 2;

FIG. 4 is a longitudinal vertical cross-sectional view of the combination brake and clutch assembly of the present invention taken along lines 4—4 of FIG. 1 and shown at rest, i.e. with the electric motor being shut off, wherein the brake is applied to the motor shaft;

FIG. 5 is a longitudinal horizontal cross-sectional view of the combination brake and clutch assembly of the present invention taken along lines 5—5 of FIG. 1 and also shown at rest, i.e. with the electric motor being shut off, wherein the brake is applied to the motor shaft; and FIG. 6 is a horizontal cross-sectional view of the present combination brake and clutch assembly which is similar to FIG. 5 but which shows the assembly during operation of the electric motor, wherein the brake is released from the motor shaft and wherein the clutch is operational to disengage from rotation part of the assembly from the motor shaft if undue forces are applied on the equipment and thus on the assembly for preventing damage to the motor.

DESCRIPTION OF THE PREFERRED EMBODIMENTS

In accordance with the present invention, FIG. 1 illustrates a combination brake and clutch assembly A shown adapted to a motor M (or to a reducing gearbox thereof) which itself is mounted on a frame F. Generally, the brake and clutch assembly A drives a main pulley P by way of a belt B. As the component of the brake and clutch assembly A which is engaged by the belt. B has a radius which is smaller than that of the main pulley P, the main pulley P will rotate at an angular speed which is lower than that of the previously mentioned assembly component. Then, behind the frame F, the pulley P normally includes a smaller pulley or sprocket (not shown), coaxial therewith, with a further belt or a chain (not shown) engaging such further pulley or sprocket. Such further belt or such chain is also engaged to another pulley or sprocket (not shown) fixedly secured, for instance, to a shaft S which drives a piece of equipment, such as a closure. The pulley or sprocket mounted to the shaft S is of larger diameter than that mounted coaxially to the pulley P again so that the angular speed of the shaft S is smaller than that of the pulley P.

Now referring to FIG. 2 which illustrates, in a perspective exploded view, the components of the combination brake and clutch assembly A of the present invention. A flat square-shaped plate 10 is fixedly secured to the motor M by four nut and bolt assemblies 12. The plate 10 defines a circular aperture 14 for allowing a motor shaft 16 (or an extension thereof) to extend past the plate 10. Therefore, the motor shaft 16 is adapted to be rotatably driven by the motor M. Substantially within the aperture 14 of the plate 10, the motor shaft 16 comprises a pin 18 which is fixedly secured to the motor shaft 16 and extends diametrically therethrough. A free end of the motor shaft 16 defines a threaded axial hole 20 and, on the periphery thereof, a longitudinal keyway 22.

Outwardly from the plate 10 on FIG. 2, the combination brake and clutch assembly A comprises in succession a brake pad 24, a drive disk 26, a clutch plate 28, a pulley 30, a compression spring 32, and an end cap 34. The brake pad 24 which is made of asbestos or of any other suitable material is of substantially circular shape while defining on the periphery thereof four substantially semi-circular cutouts 36 adapted to be disposed partly around respective nuts of the nut and bolt assemblies 12. The brake pad 24 defines a central aperture 38 of sufficient diameter for allowing the motor shaft 16 and the pin 18 to rotate freely therewithin.

The drive disk 26 includes a drive plate 40 and a sleeve 42 extending axially through the drive plate 40, further outwardly than inwardly. With reference to FIG. 3, the drive plate 40 of the drive disk 26 comprises an integral extension 44 protruding inwardly from the drive plate 40, opposite the main portion of the sleeve 42. The extension 44 defines a diametrically oriented substantially V-shaped recess 46 adapted to receive therein the pin 18, as will be explained in details hereinafter. The drive disk 26 and, more particularly, the drive plate 40, the sleeve 42 and the extension 44 thereof define a central aperture for slidably receiving the motor shaft 16. The extension 44 is adapted to extend within the central aperture 38 of the brake pad 24 and the central aperture 14 of the motor plate 10, as seen for instance in FIG. 4.

Now again referring to FIG. 2, the clutch plate 28 is comprised of a disk defining a central aperture 48 for allowing the motor shaft 16 and the sleeve 42 of the drive disk 26 to extend therethrough. The pulley 30 comprises integral first and second sections 50 and 52, respectively. The first section defines a peripheral annular flared groove 54 for receiving the belt B of FIG. 1. The second section 52 has the shape of a disk adapted to face the clutch plate 28. The pulley 30 and, more particularly, the first and second sections 50 and 52 thereof define a central aperture 56 in order to allow the motor shaft 16 and the sleeve 42 of the drive disk 26 to extend therethrough.

The end cap 34 includes a sleeve 58 of transverse dimensions similar to those of the sleeve 42 of the drive disk 26, and also includes an enlarged washer-type element 60 at an outward end of the sleeve 58. The end cap 34 and, more particularly, the sleeve 58 and the washer-type element 60 thereof define a central aperture 62 for receiving the free end of the motor shaft 16, and also define a key 64 projecting radially inwardly in the central aperture 62 and adapted for engaging the keyway 22 of the motor shaft 16.

In order to retain the brake pad 24, the drive disk 26, the clutch plate 28, the pulley 30, the compression spring 32 and the end cap 34 around the motor shaft 16, there is provided a bolt 66 adapted to threadingly engage the threaded hole 20 of the motor shaft 16, and a washer 68 adapted to abut the end washer-type element 60 of the end cap 34. As seen in FIG. 4, when the bolt 66 has been engaged in the motor shaft 16 (and when the motor M is not operating), a gap 70 appears between the sleeve 58 of the end cap 34 and the sleeve 42 of the drive disk 26 to allow for a small axial displacement of the drive disk 26, the clutch plate 28 and the pulley 30 when the motor M starts to operate, as will be described in details hereinafter.

Accordingly, FIGS. 4 and 5 show the brake and clutch assembly A in an idle position thereof, that is with the motor M not operating. FIG. 6 illustrates an operating position of the brake and clutch assembly A, that is when the motor M is operating for driving in succession the belt B, the pulley P and the smaller pulley or sprocket mounted thereto, the further belt or chain, the larger pulley or sprocket provided axially connected to the shaft S and to the shaft S itself, these latter components not being shown in FIG. 1. When the brake and clutch assembly A is in its aforementioned idle position illustrated in FIGS. 4 and 5, the force of the compression spring 32 urges the pulley 30, the clutch plate 28 and the drive disk 26 against the brake pad 24 with the pin 18 of the motor shaft 16 lying at the bottom of the V-shaped recess 46 of the drive disk 26, as best seen in FIG. 5. As the drive plate 40 of the drive disk 26 is urged against the brake pad 24, the drive disk 26 and thus the motor shaft 16 are prevented from rotating. The friction between the clutch plate 28 and the drive plate 40 of the drive disk 26 and between the clutch plate 28 and the second section 52 of the pulley 30 prevents the belt B from being rotated when the drive disk 26 is urged against the brake pad 24, in the aforementioned idle position. Accordingly, and further in view of the gearing-down mechanism between the motor shaft 16 or pulley 30 and the main shaft S, it is impossible to manually operate the equipment normally driven by the main shaft S when the motor M is not operating and, more particularly, when the compression spring 32 is allowed to urge the drive disk 26 against the brake pad 24. Furthermore, as the rotatable connection between the drive disk 26, the clutch plate 28 and the pulley 30 of the brake and clutch assembly A is provided by the pin 18 of the motor shaft 16 acting on the sides of the V-shaped recess 46 of the drive disk 26 and by frictional forces, the motor shaft 16 could not be rotated unless the pulley 30, the clutch plate 28 and the drive disk 26 can be manually rotated by way of the main shaft S, which is impossible for the reasons stated hereinbefore.

We now refer to FIG. 6 which shows the combination brake and clutch assembly A and the motor M in operation, wherein the belt B is rotatably driven by the pulley 30 for driving in turn the main pulley P and the main shaft S (see FIG. 1). When the motor M starts to operate, the rotation of the motor shaft 16 and of the pin 18 causes the pin 18 to "climb" out of the bottom of the V-shaped recess 46 thereby, in fact, pushing the drive disk 26 slightly away from the motor M and against the force of the spring 32. The limit of the outward displacement of the drive disk 26 and thus of the clutch plate 28 and of the pulley 30 occurs when the gap 70 of FIGS. 4 and 5 is closed, wherein the sleeve 58 of the end cap 34 abuts the sleeve 42 of the drive disk 26, as shown in FIG. 6.

During the rotation of the motor M and of the motor shaft 16, the pin will retain a position with respect to the V-shaped recess 46, wherein the drive plate 40 of the drive disk 26 becomes spaced apart from the brake pad 24. The force of the compression spring 32 is such that rotation of the motor M will permit the pin 18 to push the drive disk 26 out of frictional engagement with the brake pad 24 while allowing the pin 18 to exert pressure during rotation thereof on the V-shaped recess 46 so as to rotatably drive the drive disk 26. Because of the spring force of the compression spring 32, there are sufficient frictional forces between the drive disk 26 and the clutch plate 28 and between the clutch plate 28 and the pulley 30 to cause the clutch plate 28 and the pulley 30 to rotate with the drive disk 26 thereby also causing the displacement of the belt B. As the drive disk 26 is keyed to the end cap 34 and as the bolt 66 is threadably secured to the free end of the motor shaft 16, rotation of the motor shaft 16 and thus of the drive disk 26 will, aside from causing the rotation of the clutch plate 28 and of the pulley 30, also cause end cap 34 and the bolt 66 to rotate therewith. Therefore, the spring force is adjusted in order to allow the drive disk 26 to become separated from the brake pad 24 upon rotation of the motor M and also to maintain frictional engagement between the drive disk 26, the clutch plate 28 and the pulley 30 for ensuring that rotation of the motor shaft 16 causes the displacement of the belt B.

If resistance forces are transmitted to the brake and clutch assembly A by way of the belt B due, for instance, to the malfunctioning of the pulley P or of the main shaft S or to an obstruction to the rotation of the shaft S, the angular speed of rotation of the pulley 30 might be forced to decrease or the pulley 30 might even be caused to stop altogether. In such a case, the clutch plate 28 will slip and thus continue to freely rotate with the drive disk 26, whereby the motor M and the motor shaft 16 will also continue to freely rotate that motor speed thereby preventing any damage to the motor M. Since the surface of contact between the clutch plate 28 and the drive disk 26 is greater than the surface of contact between the clutch plate 28 and the pulley 30, a stoppage of the rotation of the pulley 30 will produce a slippage between the pulley 30 and the clutch plate 28 instead of between the clutch plate 28 and the drive disk 26. It is again noted that the compression spring 32 is adjusted in order to ensure sufficient friction between the drive disk 26, the clutch plate 28 and the pulley 30 in order that the rotation of the motor shaft 16 and of the pin 18 causes the rotation of these three components 26, 28 and 30 and thus the displacement of the belt B.

Accordingly, with the combination brake and clutch assembly A of the present invention, an electric motor can be provided with a brake without the use of a solenoid with this brake automatically disengaging upon rotation of the motor. Furthermore, a clutch mechanism allows the electric motor to continue to rotate even if the end equipment being driven by the motor produces, for one reason or another, a resistance against the movement being provided by the motor.

I claim:

1. A braking device for an electric motor adapted to rotate a shaft means, said braking device comprising brake means, drive means comprising first and second drive means and clutch means and adapted to transmit rotation of said shaft means to remote equipment, biasing means for urging said drive means in braking engagement with said brake means when the motor is not operating, and brake release means adapted upon rotation of the motor and thus of said shaft means to displace said drive means against the force of said biasing means and out of said braking engagement with said braking means, said shaft means being adapted to rotatably drive said drive means when the motor is in operation, said first drive means being adapted to be driven by said Shaft means when the motor is in operation and to drive said clutch means and said second drive means, said second drive means being adapted to drive the remote equipment, said clutch means being adapted to disengage the engagement between said first and second drive means when sufficient forces are applied against the rotation of said second drive means.

2. A device as defined in claim 1, wherein said clutch means is disposed between said first and second drive means, said first drive means when driven by said shaft means being adapted to frictionally drive said clutch means with said clutch means frictionally driving said second drive means, said clutch means being adapted to disengage the frictional engagement between said first and second drive means when sufficient forces are applied against the rotation of said second drive means.

3. A device as defined in claim 2, wherein said brake means, said first and second drive means and said clutch means comprise frictionally cooperating disk-shaped members concentrically mounted around said shaft means and extending perpendicularly to a longitudinal axis of said shaft means.

4. A device as defined in claim 3, wherein a pin means is diametrically mounted to said shaft means, a substantially V-shaped recess being defined diametrically on a first side of said first drive means opposite a second side thereof facing said clutch means, said pin means being adapted to rest substantially at a bottom of said recess when the motor is not operating due to said biasing means urging said drive means towards said brake means, whereas when the motor is started, a rotation of said shaft means and of said pin means causing a displacement of said drive means axially outwardly away from said brake means as said pin means climbs out of said bottom of said recess thereby releasing said braking engagement.

5. A device as defined in claim 4, wherein said first drive means is provided with a sleeve extending around said shaft means and axially outwardly from said second side of said first drive means through said clutch means and through and past said second drive means, a tubular end cap means being provided around an outer end of said shaft means and defining an outwardly and diametrically extending flange means, said end cap means and said sleeve defining between said flange means and said second drive means first and second cylindrical sections, respectively, said biasing means comprising spring means extending axially between said second drive means and said flange means of said end cap means and around said first and second cylindrical sections, a gap being defined between said first and second cylindrical sections when the motor is not operating for allowing for said displacement of said drive means axially away from said brake means upon rotation of said shaft means.

6. A device as defined in claim 3, wherein said first and second drive means being made of a similar material, a first contact surface between said first drive means and said clutch means being greater than a second contact surface between said clutch means and said second drive means such that when said sufficient forces are applied on said second drive means, a first frictional engagement between said first drive means and said clutch means is retained while a second frictional engagement between said clutch means and said second drive means is overcome thereby allowing for a reduction in the angular speed of said second drive means while said clutch means and said first drive means continue to rotate freely with said shaft means, thus preventing damage to the motor.

* * * * *